United States Patent [19]
Zaun

[11] 3,734,201
[45] May 22, 1973

[54] ROTARY HOE
[75] Inventor: Richard David Zaun, Des Moines, Iowa
[73] Assignee: Deere & Company, Moline, Ill.
[22] Filed: Oct. 19, 1970
[21] Appl. No.: 81,851

[52] U.S. Cl. .................172/551, 172/573, 172/627, 172/711
[51] Int. Cl. .............................................A01b 21/02
[58] Field of Search.....................172/382, 520, 551, 172/569, 572, 573, 500, 627, 710, 711

[56] References Cited

UNITED STATES PATENTS

| | | | |
|---|---|---|---|
| 2,252,593 | 8/1941 | Bruene | 172/551 X |
| 2,701,512 | 2/1955 | Haynes | 172/551 X |
| 2,646,730 | 7/1953 | Vig et al. | 172/573 X |
| 2,617,343 | 11/1952 | Warne | 172/254 X |
| 3,608,646 | 9/1971 | Ryan | 172/500 |
| 1,639,307 | 8/1927 | Neu | 172/572 X |
| 2,177,026 | 10/1939 | Nightenhelser et al. | 172/551 X |
| 3,452,826 | 7/1969 | Lehman | 172/551 |
| 3,220,488 | 11/1965 | Becker | 172/551 |
| 3,554,297 | 1/1971 | Lehman | 172/573 X |

FOREIGN PATENTS OR APPLICATIONS

| | | | |
|---|---|---|---|
| 679,253 | 9/1952 | Great Britain | 172/21 |
| 88,028 | 12/1936 | Sweden | 172/520 |

*Primary Examiner*—Robert E. Pulfrey
*Assistant Examiner*—R. T. Rader
*Attorney*—H. Vincent Harsha, Harold M. Knoth, William A. Murray, John M. Nolan and Raymond L. Hollister

[57] ABSTRACT

A plurality of transverse pairs of front and rear hoe wheels are individually mounted on a toolbar by spaced support arms and walker arms. The support arms are pivotally connected to the toolbar and extend rearwardly and downwardly therefrom and are normally urged downwardly by springs acting between the support arms and toolbar. The walker arms are pivotally mounted on the lower end of the support arms and rotatably carry a hoe wheel at each end. The structure permits the weight of the toolbar to be transferred to the rotary hoe wheels to provide a substantially constant and equal weight or downward force on each independent hoe wheel.

17 Claims, 3 Drawing Figures

INVENTOR.
RICHARD D. ZAUN

BY R L Hollister
ATTORNEY

ROTARY HOE

BACKGROUND OF THE INVENTION

The present invention relates generally to rotary hoes, and more particularly to the mounting of the hoe wheels to a toolbar.

Modern farming practices demand that tillage implements cover a large area so that the power of today's tractor can be economically utilized, be sufficiently flexible to follow the ground contour over their entire width, have the ability to pass over damaging obstructions such as rocks, have sufficient weight for ground penetration, and, in the case of integral implements, be sufficiently light so that they can safely be lifted with a tractor three-point hitch.

In addition to the above requirements for tillage implements in general, there are other requirements which apply to rotary hoes. For example, in order for rotary hoes to efficiently work bedded crops as well as flat crops, it is desirable that each hoe wheel have the ability to assume a vertical position different from the vertical position of an adjacent hoe wheel. It is also desirable that an equal downward force be applied on each independent hoe wheel so each wheel will work to an equal extent. Until the present invention, there has not been a rotary hoe that would meet all the noted requirements.

SUMMARY OF THE INVENTION

The principal object of the present invention is to provide a rotary hoe which meets all the requirements listed above.

A further object of the invention is to provide a rotary hoe which has constant equal down pressure on each independent hoe wheel.

Another object of the invention is to provide an extremely flexible rotary hoe which operates equally well on either flat or bedded crops and has a constant equal downward force on each independent hoe wheel.

An additional object of the invention is to provide an integral rotary hoe which operates equally well on either flat or bedded crops, has a constant equal downward force on each independent wheel, and is of light weight with the center of gravity close to the tractor.

Still another object of the invention is to provide a rotary hoe in which each individual pair of front and rear hoe wheels is free to move vertically with respect to an adjacent pair of hoe wheels, in which a constant equal downward force is applied to each pair of hoe wheels, and in which the wheels of each pair of front and rear wheels are free to move vertically with respect to each other so that the downward force applied to each pair of wheels is equally divided between the two wheels of each pair.

Yet another object of the present invention is to provide a rotary hoe which includes a toolbar adapted to be integrally connected to a tractor three-point hitch, a plurality of transversely spaced support arms pivotally connected to the toolbar and extending rearwardly and downwardly therefrom, spring means acting between the toolbar and support arms to provide a substantially constant downward force on the rear ends of the support arms, a walker arm pivotally mounted on the rear end of each support arm, and a rotary hoe wheel mounted on each end of each walker arm so that when the toolbar is lowered by the tractor three-point hitch, the weight of the toolbar is transferred to the hoe wheels to provide a constant equal downward force on each independent wheel and yet each independent wheel is free to move vertically with respect to an adjacent wheel.

The above objects and additional objects and advantages of the invention will become apparent to those skilled in the art from a reading of the following detailed description when taken in conjunction with the accompanying drawings.

DESCRIPTION OF THE PREFERRED EMBODIMENT

Figure 1:
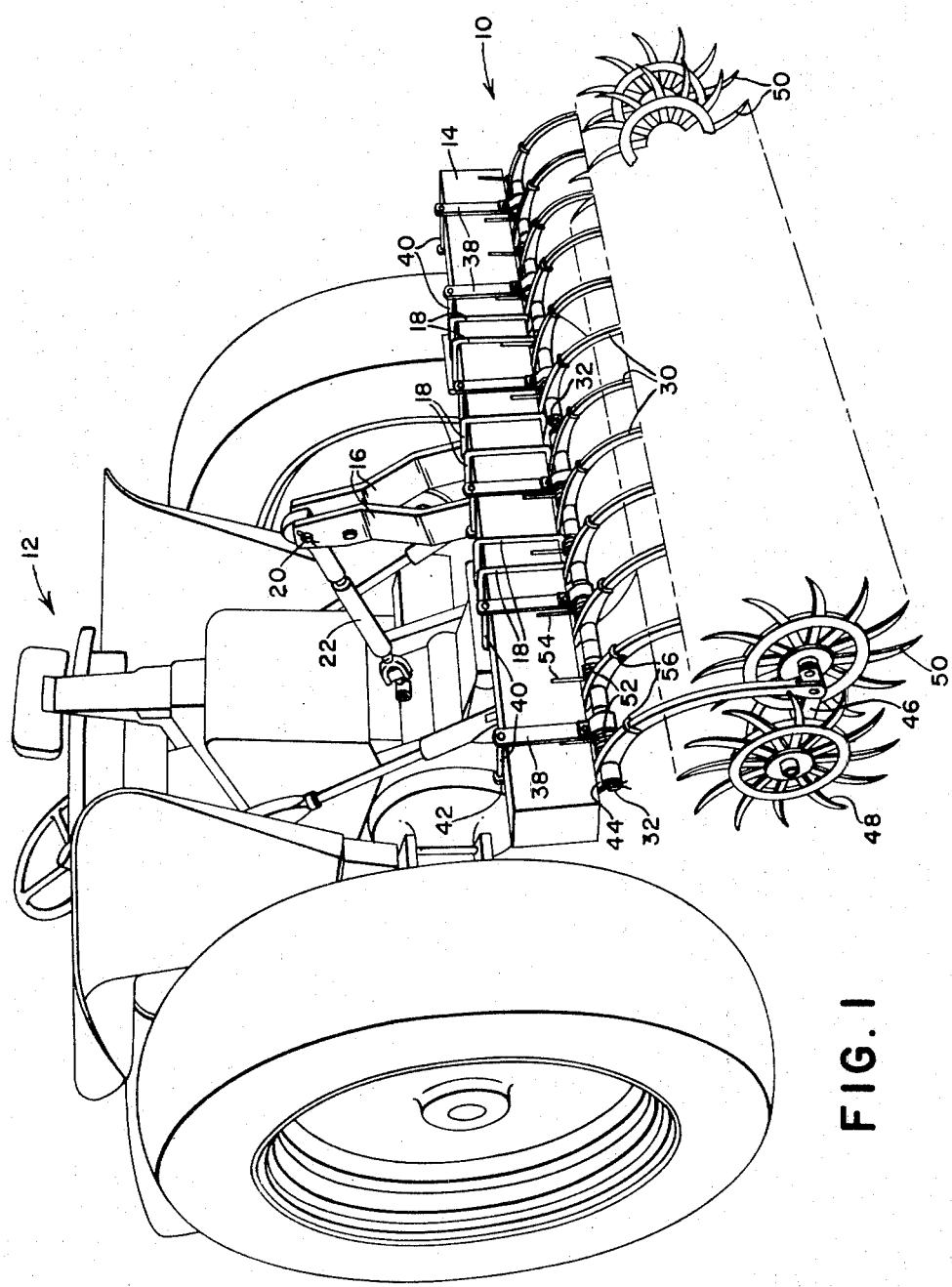
FIG. 1 is a perspective view of a rotary hoe constructed in accordance with the principles of the present invention.

A rotary hoe constructed in accordance with the principles of the present invention is indicated generally in the drawings by the numeral 10 and is illustrated as being attached to a conventional tractor 12. The rotary hoe includes a main frame which consists of an elongated toolbar 14 extending transversely to the normal direction of movement of the rotary hoe. An upstanding mast member 16 is secured to the center of the forward side of the toolbar 14 by U-bolts 18 and carries a hitch pin 20 at its upper end for connection with the compression link 22 of the tractor three-point hitch. A pair of lower hitch pins 24 are carried by brackets 26 secured to the forward side of the toolbar 14 by U-bolts 18 on opposite sides of the mast 16. The lower hitch pins 24 provide a connection with the lower draft links 28 of the tractor three-point hitch.

A plurality of transversely spaced arched support arms 30 have their forward ends pivotally connected to the toolbar 14 by one or more pivot shafts 32. There are two pivot shafts 32 shown in the illustrated embodiment of the invention, but those skilled in the art will realize that a single shaft or any number of additional shafts may be utilized. A forward portion of each of the support arms 30 is apertured to receive the shaft 32 and is provided with integral journal blocks 34 (see FIG. 3) on its opposite sides to help resist lateral forces on the arms 30. The support arms 30 are maintained in spaced apart relationship by spacer bushings 36 positioned on the shaft 32, one between each pair of adjacent support arms. The shafts 32 are mounted on the lower rear corner of the toolbar 14 by mounting straps 38, bolts 40 and forward clamp straps 42. The lower end of each mounting strap 38 is formed about one of the spacer bushings 36 and extends back along its length so that the lower bolt 40 serves to clamp the spacer bushings 36 within the lower portions of the mounting straps 38 as well as to secure the mounting straps 38 to the toolbar. The lower ends of the mounting straps could be formed directly about the shaft 32 and act as spacers between the support arms 30.

The support arms 30 extend rearwardly and downwardly from the toolbar 14 and terminate in a lower forked end portion 43. The extreme forward ends 44 of the arms 30 extend slightly forward of the shafts 32 and serve as stop means which abut against the bottom side of the toolbar 14 to limit downward pivotal movement of the arms 30.

Figure 3:
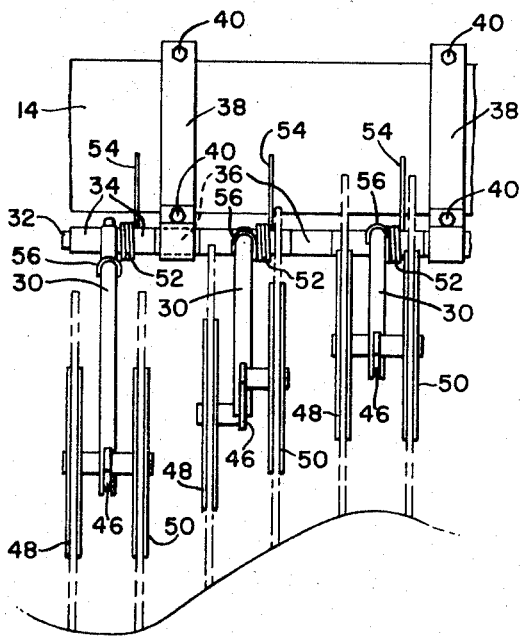
FIG. 3 is a rear elevation of the rotary hoe illustrated in FIG. 1, and illustrating the ability of the rotary hoe to conform to ground contour.

A walker arm 46 is pivotally mounted in the forked end of each support arm 30 and a pair of front and rear rotary hoe wheels 48 and 50, respectively, are journaled on the ends of each walker arm. Each of the rotary hoe wheels is of well known construction, each having a plurality of generally radially extending tines with outer tips extending slightly forwardly with respect to the direction of rotation. The front and rear wheels 48 and 50 are mounted on opposite sides of the walker arms so that the hoe wheels are spaced apart equal lateral distances as best illustrated in FIG. 3.

A downward force is applied on the hoe wheels by helical torsion springs 52. One spring 52 is wrapped about one of the journal blocks on each support arm 30, has one free end 54 in engagement with the toolbar 14 and its other free end bent to form a hook 56 which engages the associated support arm 30. When the rotary hoe 10 is lowered by the tractor three-point hitch, the weight of the toolbar 14 is transferred to the hoe wheels 48 and 50 by the helical tension springs 52. The rotary hoe is lowered until the weight of the toolbar is supported by the hoe wheels. Each of the springs 54 is of equal size so that the transferred weight is substantially equally divided among the pairs of hoe wheels. When the rotary hoe is raised, the springs 52 force the support arms 30 downwardly about the pivot shafts 32 until the forward ends 44 of the arms 30 abut against the bottom side of the toolbar 14 and prevent additional downward movement.

When the rotary hoe is in a working position, the arrangement of the support arms 30 and springs 52 provides a substantially constant downward force on each pair of hoe wheels for any given vertical position of the hoe wheels with respect to the toolbar. This can best be understood by referring to FIG. 2 wherein it can be seen that if the arm 30 pivots upwardly with respect to the toolbar, the lever arm through which the spring 52 acts increases but at the same time the spring 52 is coiled tighter so that it provides a greater force. If the lever arm 30 were to pivot downwardly, the lever arm through which the spring 52 acts would decrease but the spring 52 would also begin to uncoil so that the force it provides would decrease. Since the effective lever arm and spring force increase and decrease simultaneously, the downward force applied to each pair of the hoe wheels remains substantially constant.

Figure 2:
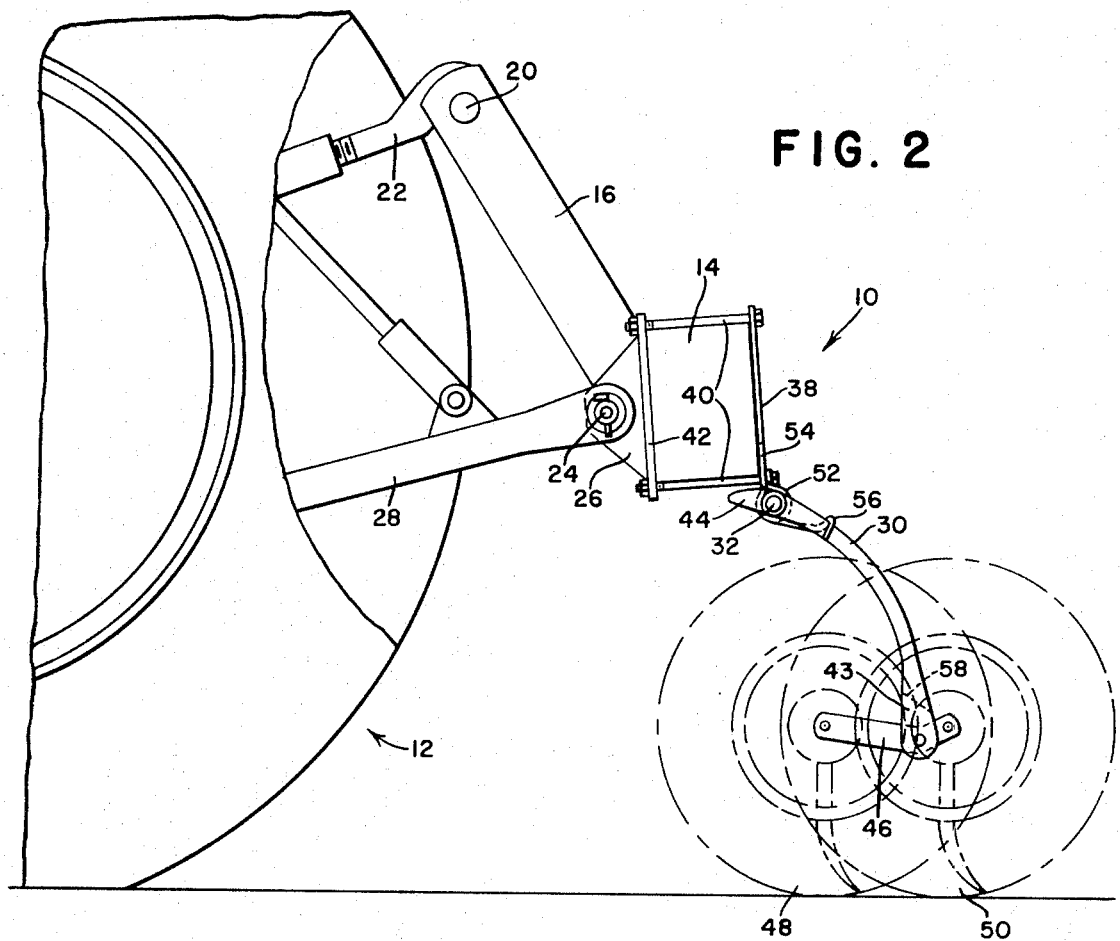
FIG. 2 is a side elevation view of the rotary hoe illustrated in FIG. 1.

During use, the reaction between the hoe wheels and soil creates a force which tends to rotate the walker arms 46 in a counterclockwise direction as viewed in FIG. 2. Unless counteracted, this force will not permit the downward force to be divided equally between the front and rear wheels of each set of wheels during use, but will transfer the greatest portion of the downward force to the front wheels. The walker arms 46 are constructed to counteract their tendency to rotate during use. The pivotal connection between each walker arm 46 and its associated support arm 30 is closer to the rear end of the walker arm 46 than to the front end so that a greater proportion of the, downward force is applied to the rear wheel 50. Also, the ends of each walker arm 46 diverge upwardly from the pivotal connection between the walker arm 46 and its associated support arm so that the centers of the axes of rotation of the front and rear hoe wheels are positioned above the pivotal connection between the walker arm and its associated support arm 30. With this construction the horizontal component of the force created by rolling resistance works through a small lever arm and tends to rotate the walker arm 46 clockwise as viewed in FIG. 2. The large proportion of down pressure applied to the rear hoe wheel in the static condition plus the positioning of the axes of rotation of the hoe wheels above the pivotal connection between the walker arm 46 and support arm 30 effectively cancel the normal tendency of the walker arm 46 to rotate during use so that, at an average speed of the rotary hoe, the downward force applied to each pair of wheels is equally divided between the wheels.

Since the walker arms 46 have a greater length forward of their pivot than rearwardly of the pivot, they will tend to rotate in a counterclockwise direction as viewed in FIG. 2 when the rotary hoe is raised to a transport position, but this rotational movement of the walker arms 46 is limited by engagement between the rear end of each walker arm and the web 58 on the bifurcated end of the support arm.

Since the weight of the toolbar 14 is transferred to the hoe wheels during use, no additional weight is required to provide a downward force on the hoe wheels and the rotary hoe can be of relatively light weight. Also, since a large portion of the weight of the rotary hoe is in the toolbar 14 which is connected directly to the tractor three-point hitch, the center of gravity of the rotary hoe is quite close to the rear of the tractor. This keeps the weight on the rear of the tractor at a minimum so that the rotary hoe can be safely lifted with the tractor three-point hitch.

From the foregoing it can be seen that the present invention provides an extremely flexible rotary hoe which may be used on either flat or bedded crops, has a constant equal downward force on each independent wheel, and is of light weight with the center of gravity close to the tractor.

Although only a single preferred embodiment of the invention has been illustrated and described, various modifications within the spirit and scope of the invention will become apparent to those skilled in the art and can be made without departing from the underlying principles of the invention. Therefore, the invention should not be restricted to the specific structure described and illustrated.

I claim:

1. A rotary hoe comprising: an elongated toolbar extending generally transversely to the normal direction of movement of the rotary hoe; means on the toolbar for connection with a tractor three-point hitch; at least one elongated pivot shaft mounted along a lower rear corner of the toolbar and extending generally parallel thereto; a plurality of support arms spaced along the length of the toolbar and having forward portions pivotally mounted on the pivot shaft for vertical swinging movement of the arms within a normal working range; the support arms extending generally rearwardly and downwardly from the toolbar and terminating in lower rear ends so that upon upward and downward pivotal movement of each support arm the horizontal dimension thereof between its lower rear end and the pivotal connection between it and the toolbar will increase and decrease respectively; the extreme forward end of each of the support arms extending under the toolbar to limit the downward pivotal movement of the support arm by engagement with the bottom of the toolbar; means acting between the toolbar and support arms to provide a downward force which increases and decreases as the support arms pivot upwardly and downwardly, respectively, on each support arm at a substantially constant horizontal distance from the pivotal connections between the support arms and toolbar so as to maintain a substantially constant downward force on the lower rear end of each support arm within its normal working range; a walker arm pivotally mounted on the lower rear end of each support arm for movement about a transverse axis; and a set of front and rear rotary hoe wheels mounted on the ends of each walker arm for independent rotation, whereby, when the rotary hoe is lowered by the tractor three-point hitch, at least a portion of the weight of the toolbar is transferred to the hoe wheels to provide a constant equal down pressure on each hoe wheel.

2. A rotary hoe set forth in claim 1 wherein the means acting between the toolbar and support arms to provide a down pressure on the lower rear ends of the support arms includes a plurality of helical torsion springs, each torsion spring being mounted on the pivot shaft and having one end acting against the toolbar and another end acting against one of the support arms.

3. A rotary hoe set forth in claim 2 wherein the lower rear end of each support arm is bifurcated to provide a pair of legs joined together at their upper end by a web, and the walker arms are pivotally mounted between the legs of the bifurcated lower rear ends of the support arms.

4. A rotary hoe set forth in claim 3 wherein the pivotal connection between each set of walker and support arms is rearward of the transverse center line of the walker arm and below the centers of the axes of rotation of the hoe wheels on the walker arms.

5. A rotary hoe comprising: an elongated frame extending generally transversely to the normal direction of movement of the rotary hoe; means on the frame for connection with a propelling vehicle; a plurality of transversely spaced support arms pivotally connected to the frame for individual pivotal movement within a normal working range; each of the support arms extending generally rearwardly and downwardly from the frame so that upon upward and rearward pivotal movement and downward and forward pivotal movement of each arm within its normal working range, the horizontal distance between the lower rear end of the arm and the pivotal connection between the arm and frame will increase and decrease respectively; spring means acting between the toolbar and each arm providing a downward bias on each arm which cooperates with the varying horizontal dimension of each arm to maintain a substantially constant downward force on the rear end of each arm; a generally fore-and-aft extending walker arm pivotally mounted on the lower rear end of each support arm; and a rotary hoe wheel having a plurality of radially extending tines with outer tip portions projecting forwardly with respect to the normal direction of rotation mounted on each end of each walker arm for rotation independent of the other whereby movement of the support and walker arms permits the rotary hoe to conform to soil contours and a substantially constant downward force is maintained on the pair of hoe wheels on each walker arm irrespective of their vertical position with respect to other pairs of hoe wheels; the pivotal connection between each set of walker and support arms being rearward of the transverse centerline of the walker arm and below the centers of the axes of rotation of the hoe wheels on the walker arm.

6. A rotary hoe as set forth in claim 5 wherein the hoe wheels on the opposite ends of each walker arm are mounted on opposite sides of their respective walker arm.

7. A rotary hoe set forth in claim 5 wherein stop means carried by each support arm will directly contact the frame to limit downward pivotal movement of the support arms.

8. A rotary hoe set forth in claim 7 wherein stop means act between the lower rear end of each support arm and the associated walker arm to limit pivotal movement of the walker arms.

9. A rotary hoe set forth in claim 8 wherein the lower rear end of each support arm is forked, the walker arms are pivotally mounted within the forked ends of the support arms, and the stop means acting between the lower rear ends of the support arms and the walker arms consists of the webs of the forked ends of the support arms.

10. A rotary hoe set forth in claim 8 wherein the spring means includes a plurality of helical torsion springs, each torsion spring being mounted on the pivot axis of one of the support arms and having its ends acting between the toolbar and the one support arm.

11. A rotary hoe for working beds and flatland comprising: an elongated toolbar extending generally transversely to the normal direction of movement of the rotary hoe; means on the toolbar for connection with a tractor three-point hitch whereby the toolbar can be raised and lowered and moved over the ground by the tractor; at least one elongated pivot shaft mounted along a lower rear corner of the toolbar and extending generally parallel thereto; a plurality of support arms spaced along the toolbar and having forward portions pivotally mounted on the pivot shaft for individual vertical swinging movement within a normal working range; the support arms being arched to extend generally rearwardly and downwardly from their forward portions to lower rear ends so that as the support arms pivot upwardly and downwardly their horizontal dimensions increase and decrease respectively; a plurality of helical torsion springs, each torsion spring being mounted on the pivot shaft and having one end acting against the toolbar and another end acting directly against one of the support arms to provide a substantially equal downward force on the lower rear end of each support arm which remains substantially constant within the normal working range of the support arms; a generally fore-and-aft extending walker arm pivotally mounted on the lower rear end of each support arm for movement about a transverse axis; and a set of front and rear rotary hoe wheels each having a plurality of generally radially extending tines having outer tip portions projecting slightly forwardly with respect to the direction of rotation mounted on the ends and on opposite sides of each walker arm for rotation of each independent of the other; the pivotal connection between each set of walker and support arms being rearward of the transverse centerline of the walker arm and below the centers of the axes of rotation of the hoe wheels on the walker arm, whereby, when the rotary hoe is lowered by the tractor three-point hitch, at least a portion of the weight of the toolbar is transferred to the hoe wheels to provide a substantially constant equal downward force on each hoe wheel during use and the support and walker arms will move about their pivots so the rotary hoe conforms to the ground contour.

12. A rotary hoe as set forth in claim 11 wherein the extreme forward ends of the support arms extend under the toolbar and limit the downward pivotal movement of the support arms by engagement with the bottom of the toolbar.

13. A rotary hoe as set forth in claim 12 wherein each of the support arms includes an integral forked lower end and the walker arms are pivotally mounted within the forked ends of the support arms, whereby, engagement between the walker arms and the webs of the forked ends of the support arms limits the movements of the walker arms with respect to the support arms.

14. A rotary hoe comprising: an elongated frame extending generally transversely to the normal direction of movement of the rotary hoe; means on the frame for connection with a propelling vehicle; a plurality of transversely spaced support arms pivotally connected to the frame for individual pivotal movement within a normal working range; each of the support arms extending generally rearwardly and downwardly from the frame so that upon upward and rearward pivotal movement and downward and forward pivotal movement of each arm within its normal working range, the horizontal distance between the lower rear end of the arm and the pivotal connection between the arm and frame will increase and decrease respectively; spring means acting between the toolbar and each arm providing a downward bias on each arm which cooperates with the varying horizontal dimension of each arm to maintain a substantially constant downward force on the rear end of each arm; a generally fore-and-aft extending walker arm pivotally mounted on the lower rear end of each support arm; and a rotary hoe wheel having a plurality of radially extending tines with outer tip portions projecting forwardly with respect to the normal direction of rotation mounted on each end of each walker arm for rotation independent of the other whereby movement of the support and walker arms permits the rotary hoe to conform to soil contours and a substantially constant downward force is maintained on the pair of hoe wheels on each walker arm irrespective of their vertical position with respect to other pairs of hoe wheels; the pivotal connection between each set of walker and support arms being rearward of the transverse centerline of the walker arm so that a greater portion of the downward force on each pair of hoe wheels is applied to the rear wheel.

15. A rotary hoe comprising: an elongated frame extending generally transversely to the normal direction of movement of the rotary hoe; means on the frame for connection with a propelling vehicle; a plurality of transversely spaced support arms pivotally connected to the frame for individual pivotal movement within a normal working range; each of the support arms extending generally rearwardly and downwardly from the frame so that upon upward and rearward pivotal movement and downward and forward pivotal movement of each arm within its normal working range, the horizontal distance between the lower rear end of the arm and the pivotal connection between the arm and frame will increase and decrease respectively; spring means acting between the toolbar and each arm providing a downward bias on each arm which cooperates with the varying horizontal dimension of each arm to maintain a substantially constant downward force on the rear end of each arm; a generally fore-and-aft extending walker arm pivotally mounted on the lower rear end of each support arm; and a rotary hoe wheel having a plurality of radially extending tines with outer tip portions projecting forwardly with respect to the normal direction of rotation mounted on each end of each walker arm for rotation independent of the other whereby movement of the support and walker arms permits the rotary hoe to conform to soil contours and a substantially constant downward force is maintained on the pair of hoe wheels on each walker arm irrespective of their vertical position with respect to other pairs of hoe wheels; the centers of the axis of rotation of the hoe wheels on each walker arm being located above the pivotal connection between the associated set of walker and support arms so that the horizontal component of the force created by rolling resistance to the wheels during use tends to transfer a portion of the downward force on the front hoe wheels to the rear hoe wheels.

16. A rotary hoe for working beds and flatland comprising: an elongated toolbar extending generally transversely to the normal direction of movement of the rotary hoe; means on the toolbar for connection with a tractor three-point hitch whereby the toolbar can be raised and lowered and moved over the ground by the tractor; at least one elongated pivot shaft mounted along a lower rear corner of the toolbar and extending generally parallel thereto; a plurality of support arms spaced along the toolbar and having forward portions pivotally mounted on the pivot shaft for individual vertical swinging movement within a normal working range; the support arms being arched to extend generally rearwardly and downwardly from their forward portions to lower rear ends so that as the support arms pivot upwardly and downwardly their horizontal dimensions increase and decrease respectively; a plurality of helical torsion springs, each torsion spring being mounted on the pivot shaft and having one end acting against the toolbar and another end acting directly against one of the support arms to provide a substantially equal downward force on the lower rear end of each support arm which remains substantially constant within the normal working range of the support arms; a generally fore-and-aft extending walker arm pivotally mounted on the lower rear end of each support arm for movement about a transverse axis; and a set of front and rear rotary hoe wheels each having a plurality of generally radially extending tines having outer tip portions projecting slightly forwardly with respect to the direction of rotation mounted on the ends and on opposite sides of each walker arm for rotation of each independent of the other; the pivotal connection between each set of walker and support arms being rearward of the transverse centerline of the walker arm so that a greater portion of the downward force on each pair of hoe wheels is applied to the rear wheel, whereby, when the rotary hoe is lowered by the tractor three-point hitch, at least a portion of the weight of the toolbar is transferred to the hoe wheels to provide a substantially constant equal downward force on each hoe wheel during use and the support and walker arms will move about their pivots so the rotary hoe conforms to the ground contour.

17. A rotary hoe for working beds and flatland comprising: an elongated toolbar extending generally transversely to the normal direction of movement of the rotary hoe; means on the toolbar for connection with a tractor three-point hitch whereby the toolbar can be raised and lowered and moved over the ground by the tractor; at least one elongated pivot shaft mounted along a lower rear corner of the toolbar and extending generally parallel thereto; a plurality of support arms spaced along the toolbar and having forward portions pivotally mounted on the pivot shaft for individual vertical swinging movement within a normal working range; the support arms being arched to extend generally rearwardly and downwardly from their forward portions to lower rear ends so that as the support arms pivot upwardly and downwardly their horizontal dimensions increase and decrease respectively; a plurality of helical torsion springs, each torsion spring being mounted on the pivot shaft and having one end acting against the toolbar and another end acting directly against one of the support arms to provide a substantially equal downward force on the lower rear end of each support arm which remains substantially constant within the normal working range of the support arms; a generally fore-and-aft extending walker arm pivotally mounted on the lower rear end of each support arm for movement about a transverse axis; and a set of front and rear rotary hoe wheels each having a plurality of generally radially extending tines having outer tip portions projecting slightly forwardly with respect to the direction of rotation mounted on the ends and on opposite sides of each walker arm for rotation of each independent of the other; the centers of the axis of rotation of the hoe wheels on each walker arm being located above the pivotal connection between the associated set of walker and support arms so that the horizontal component of the force created by rolling resistance to the wheels during use tends to transfer a portion of the downward force on the front hoe wheels to the rear hoe wheels, whereby, when the rotary hoe is lowered by the tractor three-point hitch, at least a portion of the weight of the toolbar is transferred to the hoe wheels to provide a substantially constant equal downward force on each hoe wheel during use and the support and walker arms will move about their pivots so the rotary hoe conforms to the ground contour.

* * * * *